Nov. 28, 1933.  J. R. ANGER  1,936,573

COUPLING DEVICE FOR ALIGNED SHAFTS

Filed Jan. 13, 1928   2 Sheets-Sheet 1

Inventor:
J. R. Anger

Nov. 28, 1933.  J. R. ANGER  1,936,573
COUPLING DEVICE FOR ALIGNED SHAFTS
Filed Jan. 13, 1928   2 Sheets-Sheet 2

Patented Nov. 28, 1933

1,936,573

UNITED STATES PATENT OFFICE 1,936,573

COUPLING DEVICE FOR ALIGNED SHAFTS

Jacques Robert Anger, Paris, France

Application January 13, 1928, Serial No. 246,599, and in France January 15, 1927

3 Claims. (Cl. 64—91)

It is often necessary in the construction of machines and more especially in the building of motor vehicles to couple two shafts rotating round their axis and which are theoretically aligned by the bearings holding them at their opposite ends but show practically a slight lack of alinement.

This defect is due to several causes: difficulty of the necessary accurate measurements, shocks, unequal wearing of the bearings, giving way of the supports and the like.

For instance a dynamo machine is borne by a locomotive; when the locomotive is at rest the alignment is correct; when it moves in curves the gyroscopic forces acting separately on the dynamo shaft and on the shaft of the turbine for instance which drives it have a tendency to keep the said shafts parallel to the prior direction followed by the locomotive; the result is that the shafts have a tendency to pass out of their bearings whereby a temporary lack of alignment is caused, this lack of alignment ceasing after pendular oscillations when the locomotive will have resumed its rectilinear movement.

Some of these causes of the lack of alignment cannot be removed and it is necessary to provide play in the coupling so as to avoid any deformation of its parts. For instance, it has been proposed to use disc couplings comprising two plates or discs borne by the opposite ends of the two shafts and connected through removable parts such as two rods or pins engaging recesses provided in the two discs at 180° one with reference to the other or else projections raised on one plate and engaging recesses in the other.

Diagrammatical Fig. 1 shows how the driving connection is provided with two pins disposed at 180° from one another on plates borne by discs not in perfect alignment. I will suppose 1 to be the center of the driving shaft and 2 that of the driven shaft, $d$ being the distance between these centers and that both shafts rotate anticlockwise with the same angular speed $w$.

If the path of a given point on the plate keyed to the driving shaft on the other plate is considered, it is easy to see this path is a circle having a radius equal to $d$ and the center of which is on a parallel to the line 1, 2 passing through the said point. For instance, the path of point 3 is a circle having as a center the point 4, the paths of points 5, 7, 9 and the like being circles having as centers the points 6, 8, 10 and the like, all the circles having radii equal to $d$. The two pins being symmetrically disposed with reference to point 1, their axes describe circles having 1 as a center and R for radius. I have shown on Fig. 1 two series of positions for these pins, one series being shown at 3, 5, 7, 9 and the other at diametrically opposed points 3', 5', 7', 9'. The centers of their paths with reference to plate 1 are 4, 6, 8, 10 and 4', 6' 8', 10' respectively. The pins not being geometrical lines but e. g. cylinders having radii equal to $r$ secured to the driving plate, it is necessary to provide recesses for them in the driven plate, which recesses are cylindrical and concentric with the path of the center of the pin considered and have a radius $d+r$. This circle and the corresponding pin have been shown only in the position where the center of the pin is at 5.

It may be seen at once that a pin will be operative that is to say will transmit energy from the driving shaft to the driven shaft when it occupies positions such as 3, 5, 7, 9, the opposite pin having no action at the moment considered.

On the other hand as shown on Fig. 1 the action 11—12 of the pin on its recess to which it is tangent at 11 may be decomposed into two components 11—13 perpendicular to the radius 2—11 and 11—14 directed along this radius. The first component 11—13 will alone have a useful action. Now this component is equal to zero when the pin is at 3 or 3' and is maximum in an intermediate position.

The driven shafts will be actuated properly only on a sector such as 15—16 which is a first drawback of the known construction shown.

On the other hand as the value $d$ of the distance between the centers of the plates cannot be predetermined it is impossible to form the recesses for the the pins at the exact diameter 2 $(d+r)$ and it is necessary to provide for the maximum lack of alignment possible, 1 mm. for instance whereby the recesses will have a diameter larger by 2 mm. than the diameter of the pins.

The result is the pins have a certain play in their recesses and when they come in their driving sector or when they leave it, there will arise shocks very detrimental to their proper conservation.

It has been supposed hereinbefore the plates or discs rotate at the same speed $w$. But in practice this is not quite true. The point 11 which has the same absolute speed on both plates is generally not at equal distances from the centers 1 and 2. The result is that the angular speed $w'$ of the driven plate will be different from that $w$ of the driving plate and will vary between $$w' = w\frac{R}{R-d}$$

for point 3 and $$w' = w\frac{R}{R+d}$$

for point 3'.

These irregular speeds and consequent irregular accelerations and transfer of energy are also most detrimental to the proper conservation of the coupling.

The above disclosed drawbacks are not avoided by the other types of couplings such as the screw-driver clutch. As to the yielding couplings of rubber for instance, they show the great drawback of transmitting the stresses to the bearings which are thus worn oval.

It is thus seen that using one or two pins shall have serious drawbacks, we are then, on purpose to regulate the speed, and to have always one pin driving in good conditions, to use at least three pins.

If we suppose three pins are used at 120° from each other, as the arc 15—16 is greater than 120°, it is obvious there is always one pin in this angle that is to say there is always one pin driving under proper conditions.

We should obtain a better regularity in the movement by increasing the number of the pins, but that should have other drawbacks; in studying theoretically the movement of a coupling devices with numerous pins, I have discovered that there is only one pin driving at the same time, in consequence it is necessary to give to each pin a diameter great enough to allow it to transmit the total effort from the driving to the driven shaft without exaggerated wearing.

The object of my invention is a device according to such theoretical conclusions characterized by the fact that it comprises three pins, whose diameters are such that each one is able to transmit the whole effort from the driving to the driven shaft, and that the play, i. e. the difference between the diameters of a pin and of the corresponding recess is determined by the greatest possible value foreseen for the lack of alignment.

In some cases, for instance, a dynamo machine borne by a locomotive, it happens to be difficult to foresee the maximum of the lack of alignment; but it can be easily determined by experience in the following manner. I put in the recesses some pins constructed of a very soft matter, these are rapidly worn and so take the diameter corresponding to the maximum of value allowable for the lack of alignment; these pins are then removed and in place are put pins of harder material having the same diameter than the first ones after wear.

I have supposed up till now the pins to be secured to the driving plate; but it is preferable according to my invention, to provide blind recesses in both plates for receiving small independent cylinders 17 acting as pins, made of suitable material and the ends of which rotate freely inside a recess of each plate respectively (Fig. 2). This affords a lessening of the play. The radius $x$ of the blind recess will be given by the equation $$d=2(x-r)$$

so that X being equal to $$\frac{d}{2}+r$$

the play will be half that calculated in the precedent case.

I have supposed hereinabove the pin to be a cylinder but the pin may also consist according to my invention of two superposed coaxial cylinders of different diameters, the blind recesses engaged by the pins having corresponding different diameters. Moreover the fact that the pins are freely inserted in the recesses allows them to rotate therein and affords an equal wear of their whole periphery.

I have described hereinbelow and shown on appended drawings, by way of example a form of execution of my invention.

Figure 1:
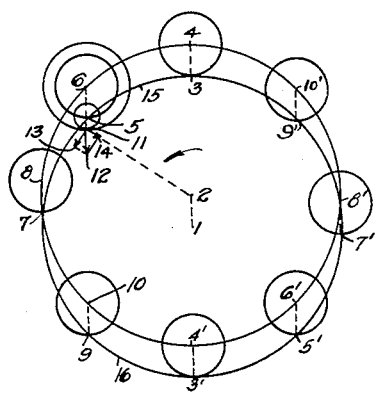
Figs. 1 and 2 are theoretical diagrams which allow the principle of my invention to be well understood.
Figure 2:
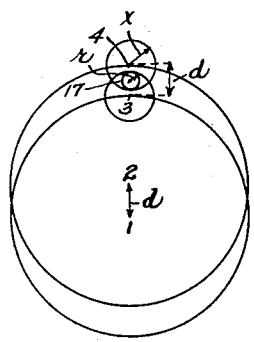
Figure 3:
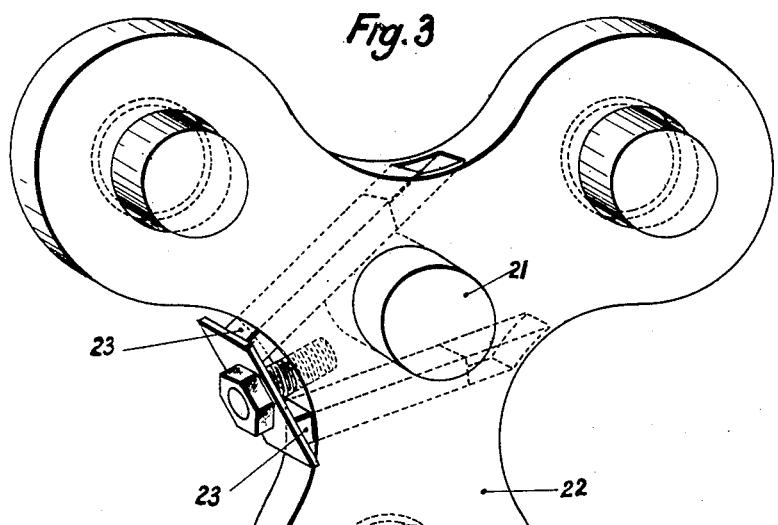
Fig. 3 shows in perspective view one of the shafts with its coupling plate provided with three pins according to my invention.
Figure 4:
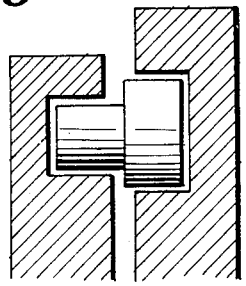
Fig. 4 is a cross section of the plates by a diametrical plane showing the coupling pin consisting of two cylinders of different diameters.

On Fig. 3, 21 is the shaft and 22 the three-armed plate secured thereto and bearing in the three recesses such as 24 three independent pins. These pins may be secured to one of the plates in which case play would occur only in the recess provided in the other plate. The recesses in the two plates and the corresponding ends of the pins may also have different diameters as shown on Fig. 4.

It seems however preferable to use for the pins cylindrical parts having the same diameter throughout and rotating freely in recesses having an equal diameter in which case the play is reduced by one half as explained hereinabove. Pins disposed in this manner rotate round their axis in their recess whereby their wear is made very regular. Moreover in the case of perfect alignment the centrifugal force together with the driving and driven action to which they are submitted places the pins in a position stationary with reference to the two plates so that all shocks are avoided and the rotation of the shafts is perfectly regular. The pins are made of metal or even wood, a hard and fat species, such as lignum vitæ being preferably chosen.

Obviously the wear on the pins will be considerably more rapid than that of the plates, as is desirable by reason of their easier and cheaper replacement.

The following arrangement allows a very easy replacement of the pins without requiring the plates to be moved apart.

Figure 5:
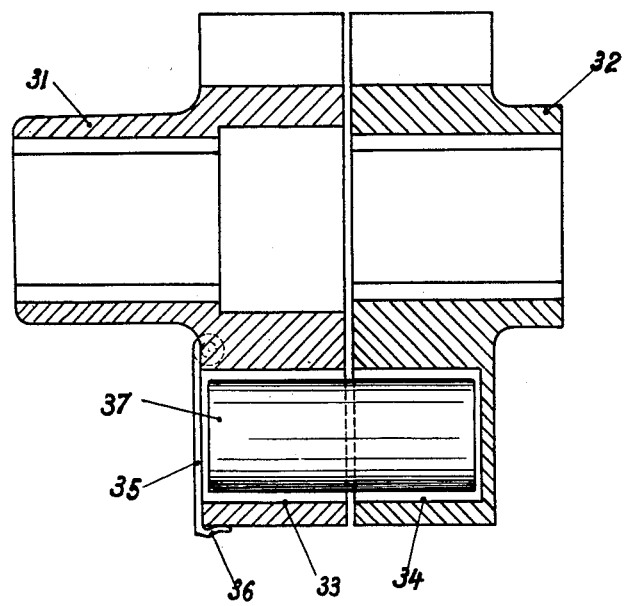
Fig. 5 is a cross section along the axis of one of the recesses in an improved coupling allowing an easy replacement of the pins.
Figure 6:
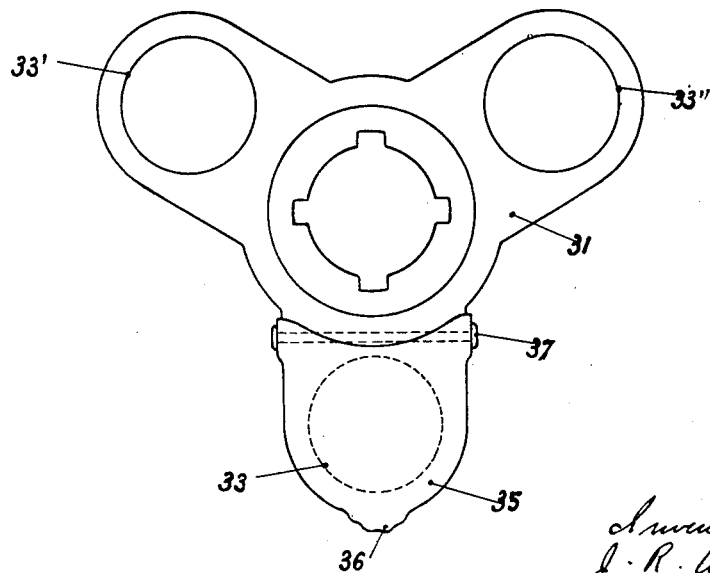
Fig. 6 is an end view of one of the coupling plates of a coupling according to Fig. 5.

To each of the shafts (Figs. 5, 6) is keyed a plate 31, 32. The plate 31 shows three cylindrical holes 33, 33', 33''. The other plate 32 has corresponding holes 34, 34', 34''. The pins 37 of wood or other suitable material engage simultaneously with a certain play the holes 33, 34, etc. The holes 34 in plate 32 are shown blind whereas the holes such as 33 are closed by covers 35 on the outside of plate 31. These covers are provided with locking means 36 and may pivot round an axis perpendicular to the axis of the shafts and disposed in proximity thereto. Under these conditions it is obvious that the rotation of the plates will urge the cover against its seat and therefore hold the pin 37 in place. Obviously if the pin 37 had two different diameters the recess or hole having the smaller diameter should be blind and the other be open and closed by a cover.

By means of the above described device it is possible for instance to couple machines such as a dynamo and a turbine borne by the same support and the casings of which leave very little place between them.

What I claim is:

1. In a coupling, two substantially aligned shafts, discs carried by the shafts and having circular recesses therein, three pins located in said recesses and differing in diameter therefrom to an extent corresponding to the maximum lack of alignment of the shafts, the said pins being formed of a material having a lower degree of resistance to wear than said discs.

2. A coupling device for transmitting motion between two substantially parallel rotatable shafts, comprising discs secured one to each of the adjacent ends of the said shafts, each disc being comprised of a central portion and a plurality of arms extending substantially radially therefrom and spaced from each other at substantially equal angular distances, each arm having a recess therein arranged substantially along the center line of the arm, the recesses being at substantially equal radial distances from the center of the disc, and cylindrical pins in the recesses and joining the discs, the pins being of slightly less diameter than the recesses in which they are situated, the pins being formed of material less tough or wear-resisting than that from which said discs are formed.

3. In a coupling, two substantially aligned shafts, discs carried by the shafts and having an odd number of recesses therein, pins located one in each of said recesses and differing in diameter therefrom to an extent corresponding to the maximum lack of alignment of the shafts, the pins being formed of a material having a lower degree of resistance to wear than said discs.

JACQUES ROBERT ANGER.